(12) United States Patent
Raynel et al.

(10) Patent No.: US 11,008,521 B1
(45) Date of Patent: May 18, 2021

(54) CONTROL OF DEMULSIFIER INJECTION INTO CRUDE OIL ENTERING SEPARATORS

(71) Applicant: Saudi Arabian Oil Company, Dhahran (SA)

(72) Inventors: Guillaume Robert Jean-Francois Raynel, Dhahran (SA); Debora Salomon Marques, Dhahran (SA); Olanrewaju Malcolm Oshinowo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/596,025

(22) Filed: Oct. 8, 2019

(51) Int. Cl.
| C10G 33/08 | (2006.01) |
| B01D 17/12 | (2006.01) |
| G05D 7/06 | (2006.01) |
| B01D 17/04 | (2006.01) |

(52) U.S. Cl.
CPC .......... *C10G 33/08* (2013.01); *B01D 17/047* (2013.01); *B01D 17/12* (2013.01); *G05D 7/0617* (2013.01); *C10G 2300/201* (2013.01)

(58) Field of Classification Search
None
See application file for complete search history.

(56) References Cited

U.S. PATENT DOCUMENTS

| 4,180,457 A | * | 12/1979 | Popp | C10G 33/04 208/188 |
| 4,428,839 A | * | 1/1984 | Davies | B04C 5/14 95/253 |
| 4,481,130 A | * | 11/1984 | Robertson | C10G 33/00 516/154 |
| 4,581,134 A | | 4/1986 | Richter, Jr. et al. | |

(Continued)

FOREIGN PATENT DOCUMENTS

| WO | WO2018129228 | 7/2018 |
| WO | WO2018236644 | 12/2018 |

OTHER PUBLICATIONS

J. Wu, Y. Xu, T. Dabros, and H. Hamza, "Effect of Demulsifier Properties on Destabilization of Water-in-Oil Emulsion", May 2003, Energy & Fuels 2003, 17, 1554-1559. (Year: 2003).*

(Continued)

*Primary Examiner* — Mohammad Ali
*Assistant Examiner* — Kelvin Booker
(74) *Attorney, Agent, or Firm* — Fish & Richardson P.C.

(57) ABSTRACT

A computer-implemented method includes controlling water separation in a hydrocarbon stream flowing through a separator train including one or more separator vessels located upstream of a dehydrator by adjusting a flowrate of demulsifier added to the separator train by receiving data from a real-time process test of the separation train, quantifying a demulsifier inertia value from the process data, estimating model fit parameters to the process data to generate a water separation profile (WSP) correlating water draw-off and (Continued)

demulsifier flowrate for the separation train, and during operations, modifying the demulsifier flowrate according to the WSP and according to the inertia value to achieve a received target water separation value for the stream entering the dehydrator.

15 Claims, 11 Drawing Sheets

(56) References Cited

U.S. PATENT DOCUMENTS

| | | | | |
|---|---|---|---|---|
| 4,592,849 | A * | 6/1986 | McMillen | B01D 17/045 210/799 |
| 4,627,458 | A * | 12/1986 | Prasad | C10L 1/328 137/13 |
| 4,737,265 | A * | 4/1988 | Merchant, Jr. | C10G 33/04 166/267 |
| 4,818,410 | A * | 4/1989 | Bellos | B01D 17/0208 210/639 |
| 4,961,858 | A * | 10/1990 | Spei | C10G 33/04 210/708 |
| 5,256,305 | A * | 10/1993 | Hart | C10G 33/04 208/251 R |
| 5,353,237 | A * | 10/1994 | Bass | G05D 21/02 700/272 |
| 5,693,257 | A * | 12/1997 | Hart | B01D 17/047 208/188 |
| 5,885,424 | A * | 3/1999 | Davis | B01D 17/0208 204/157.42 |
| 6,039,880 | A * | 3/2000 | Morataya | B01D 17/041 210/708 |
| 6,153,656 | A * | 11/2000 | Bourg | B01D 17/047 516/183 |
| 6,168,702 | B1 * | 1/2001 | Varadaraj | C10G 33/04 204/567 |
| 6,555,009 | B2 * | 4/2003 | Varadaraj | C10G 33/00 204/157.15 |
| 9,157,035 | B1 | 10/2015 | Ball, IV et al. | |
| 9,181,499 | B2 | 11/2015 | Mason et al. | |
| 9,861,910 | B2 * | 1/2018 | Hammad | B01D 53/1425 |
| 10,260,007 | B2 * | 4/2019 | Barroeta | C10G 53/02 |
| 2009/0166028 | A1 * | 7/2009 | Varadaraj | C10G 33/04 166/244.1 |
| 2009/0321323 | A1 * | 12/2009 | Sharma | C10G 1/002 208/390 |
| 2013/0026082 | A1 * | 1/2013 | Al-Shafei | C10G 33/02 210/96.1 |
| 2013/0104772 | A1 * | 5/2013 | Schabron | B01F 17/0014 106/277 |
| 2015/0152340 | A1 * | 6/2015 | Cherney | C10G 31/08 208/290 |
| 2015/0175904 | A1 * | 6/2015 | Yeganeh | C10G 33/04 204/567 |
| 2015/0225655 | A1 * | 8/2015 | Adams | C10G 33/04 516/138 |
| 2015/0267127 | A1 * | 9/2015 | Yeganeh | B01D 17/06 204/567 |
| 2017/0319984 | A1 * | 11/2017 | Oshinowo | B01D 17/12 |
| 2018/0066194 | A1 * | 3/2018 | Soliman | C10G 7/00 |
| 2018/0187095 | A1 * | 7/2018 | Soliman | C10G 31/08 |
| 2018/0195010 | A1 * | 7/2018 | Salu | C10G 31/08 |
| 2018/0216016 | A1 * | 8/2018 | Bakas | C10G 75/02 |
| 2018/0371876 | A1 * | 12/2018 | Lopez | C10G 33/08 |
| 2019/0211274 | A1 * | 7/2019 | Soliman | B01D 17/06 |
| 2019/0240613 | A1 * | 8/2019 | Raynel | B01D 53/18 |
| 2019/0247770 | A1 | 8/2019 | Oshinowo | |
| 2020/0040263 | A1 * | 2/2020 | Syed Khuzzan | B01D 17/047 |

OTHER PUBLICATIONS

Tor Steinar Schei, Peter Singstad and Aage Jostein Thunem, "Transient simulations of gas-oil-water separation plants", Dec. 1990, Modeling, Identification and Control, 1991, vol. 12, No. I, 27-46 (Year: 1990).*

C. Richard Sivalls, "Oil and Gas Separation Design Manual", Section: 300, Technical Bulletin No. 142, Rev. 7, Feb. 10, 2009. (Year: 2009).*

Partho S. Roy and Ruhul Amin M., "Aspen-HYSYS Simulation of Natural Gas Processing Plant", Journal of Chemical Engineering, IEB, vol. ChE. 26, No. 1, Dec. 2011. (Year: 2011).*

Mark Bothamley, "Quantifying Oil/Water Separation Performance in Three-Phase Separators—Part 1", Mar. 22, 2017, Mark Bothamley Consulting LLC. (Year: 2017).*

Young H. Kim and Darsh T. Wasan, "Effect of Dennulsifier Partitioning on the Destabilization of Water-in-Oil Emulsions", Ind. Eng. Chem. Res. 1996, 35, 1141-1149. (Year: 1996).*

PCT International Search Report and Written Opinion in International Appln. No. PCT/US2020/054762, dated Feb. 25, 2021, 13 pages.

PCT International Search Report and Written Opinion in International Appln. No. PCT/US2020/054775, dated Jan. 21, 2021, 12 pages.

* cited by examiner

US 11,008,521 B1

CONTROL OF DEMULSIFIER INJECTION INTO CRUDE OIL ENTERING SEPARATORS

TECHNICAL FIELD

This disclosure relates to control of water concentration in crude oil entering dehydrators.

BACKGROUND

Raw wild crude produced from wells typically are a mixture of gas, liquid hydrocarbons, and salty formation water. In the upstream section of oil and gas industries, the function of a Gas-Oil-Separation Plant (GOSP) is to adequately separate gas and salty water from the crude oil to acceptable specifications for downstream processing and for easy transportation. Excessive salt and water in crude oil from a GOSP can result in corrosion in transportation pipelines and refining units and can also produce detrimental scaling effects. As part of the GOSP operations, produced crude oil is separated from salty water in a wet crude handling facility that includes dehydrator and desalter vessels. Demulsifier chemicals enhance the separation of the tight emulsion of salty water and oil according to specifications related to basic sediment and water content. A typical GOSP includes multiple phase separators in a separator train. These separators include a high-pressure production trap (HPPT) that separates gas at pressures of 150-450 psig from the crude oil, a low-pressure production trap (LPPT) that separates gas at pressures around 50 psig from the crude oil, and a low pressure degassing tank (LPDT). The concentrated crude is then delivered to a dehydration train of one or more dehydrators.

SUMMARY

This disclosure relates to methods of determining an accurate demulsifier dosage to remove a specific quantity of water from a hydrocarbon stream processed in a series of one or more phase separator vessels in a train of separators in a GOSP. The methodology includes field-based, real-time, in-process control where the response of the separator train to a step-wise increment in demulsifier dosage is analyzed. The methods provide plant operators with a demulsifier concentration as a function of the target rate of water separation from one or more of the vessels in the separator train. The calculation of the demulsifier dosage is based on a mathematical model of the kinetics of the demulsifier effect extracted from the separator vessels' real-time response and water separation rates during the specific step-wise incremented and decremented demulsifier injection rates conducted during operations. The methods are applicable to real-time separation plant operating conditions and the specific properties of the incoming crude oil.

Proper demulsifier dosage is a challenge to production. Changes in production, such as a change of the demulsifier chemical, variation in temperature or oil properties (for example, due to shut down or addition of wells) can affect the efficiency of the added demulsifier. If the amount delivered is above the optimum required, demulsifier is wasted. If the amount is below the optimum required, production upsets such as off-spec export oil or off-spec produced water can occur. Generally, quantities above the required amount are used to prevent off-spec production, resulting in waste of demulsifier. This disclosure offers a solution to the demulsifier dosage determination without considering production history, but rather by using feedback from the current oil, taking into consideration the required plant needs for water drop-out on the production traps.

The methods described control the water concentration entering the dehydrator(s) by automatically adjusting the rate of demulsifier entering the phase separators, whether a LPPT/LPDT or a HPPT/LPPT production trap. This automation is based on a water separation profile (WSP) that models the uniqueness of the chemical behavior of a given demulsifier in a specific process. Acquiring and using a WSP allows accurate control of the water draw-off without estimation or use of historical data. These methods are not, or only slightly, affected by the oscillation of emulsion flowrate based on the produced crude oil and water flow rates.

To develop the WSP, the target demulsifier undergoes incremental concentration tests during a few days and the subsequent response is collected at flow meters already available at the plant. The response is then analyzed and the overall water drop-out plotted against demulsifier concentration and fitted as a sigmoid function, corresponding to the demulsifier behavior for a given process.

These methods maintain a stable water concentration at the inlet of the dehydrator(s) and minimizes the load on the dehydrator(s) by control of the water concentration in the crude oil at the outlet of the last separator (whether LPPT or LPDT). Furthermore, the discovery of an inertia in the process due to the uniqueness of the chemical behavior of the demulsifier is an unexpected result of these methods. By considering demulsifier inertia, these process automation strategies avoid under- or over-estimating the demulsifier injection flow rate or dosage added to the inlet wet crude stream.

The WSP curve implemented within the process control system to control to targeted water separation from the separation train is sigmoidal and suited for the use of machine learning in the WSP parameter estimation. The result is robust, auto-tuned demulsifier control methods and systems. Developing and implementing a WSP model for the demulsifier dosage of a particular process controls a specific demulsifier in a specific gas-oil-separation plant for improved control on the demulsifier utilization. The WSP model incorporates the influence of crude type, produced crude oil and water flow rates, process temperature, and the separator level set points. The model enables operators to set a target separation performance, and the demulsifier injection is then adjusted according to the WSP model.

In some implementations, a computer-implemented method includes controlling water separation in a hydrocarbon stream flowing through a separator train including one or more separator vessels located upstream of a dehydrator by adjusting a flowrate of demulsifier added to the separator train by receiving data from a real-time process test of the separation train, quantifying a demulsifier inertia value from the process data, estimating model fit parameters to the process data to generate a water separation profile (WSP) correlating water draw-off and demulsifier flowrate for the separation train, and during operations, modifying the demulsifier flowrate according to the WSP and according to the inertia value to achieve a received target water separation value for the stream entering the dehydrator.

The method can include one or more of the following features. The real-time process test data are acquired by: performing a series of step-wise increases up to a peak value in incoming demulsifier flowrate during a series of time periods to achieve a target flowrate of demulsifier for each time period, recording an actual demulsifier flowrate and a water draw-off rate during each time period, performing a series of step-wise decreases of the incoming demulsifier flowrate entering the separator train during a time period to achieve a target flowrate of demulsifier for each time period, and recording the actual demulsifier flowrate and a water draw-off rate during each time period. Determining a stabilization time during each time period for the recorded water draw-off rate to stabilize. Determining the stabilization time includes identifying an end of an increase of average water draw-off of the dehydrator as well as the decrease of the average water draw-off of the last vessel. Determining the stabilization time includes identifying an end of the decrease of the average water draw-off of the separation train. Adjusting the demulsifier flowrate includes adjusting the demulsifier flowrate according to a temperature-specific WSP. Each time period is 24 hours.

In some implementations, a system includes a separator train including one or more separator vessels, a dehydrator located downstream of the separator train, a demulsifier reservoir connected to the separator train, and one or more processors with a non-transitory computer-readable storage medium coupled to the one or more processors and storing programming instructions for execution by the one or more processors. The programming instructions instructing the one or more processors to perform operations including: controlling water separation in a hydrocarbon stream flowing through a separator train including one or more separator vessels located upstream of a dehydrator by adjusting a flowrate of demulsifier added to the separator train from the demulsifier reservoir by: receiving data from a real-time process test of the separation train, quantifying a demulsifier inertia value from the process data, estimating model fit parameters to the process data to generate a water separation profile (WSP) correlating water draw-off and demulsifier flowrate for the separation train, and during operations, modifying the demulsifier flowrate according to the WSP and according to the inertia value to achieve a received target water separation value for the stream entering the dehydrator.

The system can include one or more of the following features. The real-time process test data are acquired by: performing a series of step-wise increases up to a peak value in incoming demulsifier flowrate during a series of time periods to achieve a target flowrate of demulsifier for each time period, recording an actual demulsifier flowrate and a water draw-off rate during each time period, performing a series of step-wise decreases of the incoming demulsifier flowrate entering the separator train during a time period to achieve a target flowrate of demulsifier for each time period, and recording the actual demulsifier flowrate and a water draw-off rate during each time period. Determining a stabilization time during each time period for the recorded water draw-off rate to stabilize. Determining the stabilization time includes identifying an end of an increase of average water draw-off of the dehydrator as well as the decrease of the average water draw-off of the last vessel. Determining the stabilization time includes identifying an end of the decrease of the average water draw-off of the separation train. Adjusting the demulsifier flowrate includes adjusting the demulsifier flowrate according to a temperature-specific WSP. Each time period is 24 hours.

In some implementations, a non-transitory, computer-readable medium storing one or more instructions is executable by a computer system to perform operations including controlling water separation in a hydrocarbon stream flowing through a separator train including one or more separator vessels located upstream of a dehydrator by adjusting a flowrate of demulsifier added to the separator train by receiving data from a real-time process test of the separation train, quantifying a demulsifier inertia value from the process data, estimating model fit parameters to the process data to generate a water separation profile (WSP) correlating water draw-off and demulsifier flowrate for the separation train, and during operations, modifying the demulsifier flowrate according to the WSP and according to the inertia value to achieve a received target water separation value for the stream entering the dehydrator.

The following terms apply to this disclosure. A "demulsifier concentration" is a measurement of concentration, typically in parts per million (ppm) of demulsifier chemical in the total fluid, such as a fluid including oil and water. An "HPPT separation efficiency" is a percentage of water separated in the HPPT versus the total water removed at the GOSP. An "HPPT retention time" is a time, in minutes, for water to separate from crude in an HPPT separation compartment, such as upstream water.

The term "real-time," or similar terms correspond to events that occur within a specified period of time, such as within one minute, within one second, or within milliseconds.

The term demulsifier "dosage", "concentration" and "flowrate" should be understood as the amount of demulsifier in the overall fluid at a given time.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

The following detailed description describes techniques for managing demulsifier dosing. Various modifications, alterations, and permutations of the disclosed implementations can be made and will be readily apparent to those of ordinary skill in the art, and the general principles defined can be applied to other implementations and applications, without departing from scope of the disclosure. In some instances, details unnecessary to obtain an understanding of the described subject matter can be omitted so as to not obscure one or more described implementations with unnecessary detail and in as much as such details are within the skill of one of ordinary skill in the art. The present disclosure is not intended to be limited to the described or illustrated implementations, but to be accorded the widest scope consistent with the described principles and features.

Figure 1:
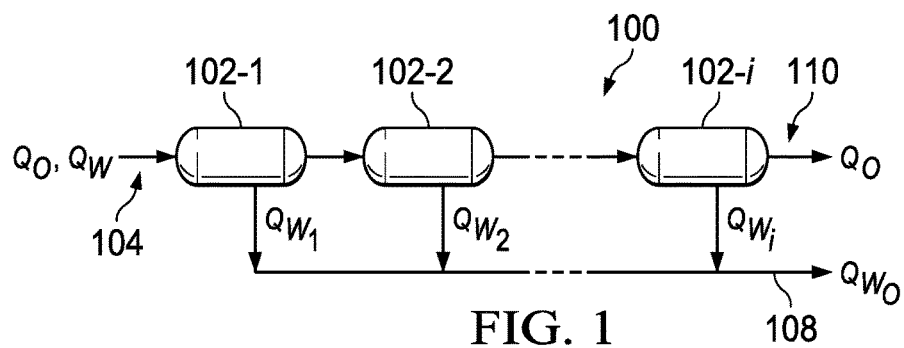
FIG. 1 is a water draw-off from a series of separators in a separator train.

FIG. 1 illustrates a separator train 100 with water draw-off from a series of separator vessels 102-1, 102-2 . . . 102-$i$. The inlet flowrate 104 is made up of an oil flowrate Qo and an inlet water flowrate Qw. A portion of the inlet water flowrate Qw is separated at each of the separator vessels 102-1, 102-2, . . . 102-1, so that the total water draw-off flowrate 108 or Qwo is the sum of the water draw-off flowrates $Q_{w1}$, $Q_{w2}$, . . . $Q_{wi}$ at each separators. The unchanged oil flowrate Qo and any remaining outlet water still mixed with the oil, flowrate Qwo, exits the separator train 100 as outlet fluid 110. The amount of water draw-off from the inlet flow 104 can be considered as the sum of the ratio of the water flowrates $Q_{w1}$, $Q_{w2}$, . . . $Q_{wi}$ to the inlet flow 104 of wet crude emulsion:

$$\text{Inlet Water Cut } (W.C.) = \frac{Q_w}{Q_o + Q_w} = \frac{\sum_i Q_{w_i}}{Q_o + Q_w} = \frac{Q_{w_1}}{Q_e} + \frac{Q_{w_2}}{Q_e} + \ldots + \frac{Q_{w_i}}{Q_e}$$

where $Q_c$ is the inlet flow 104 of wet crude emulsion. The water draw-off is a dimensionless parameter, given in percentage, as $$i^{th} \text{ Separator Water Draw} - \text{off, \%} = \frac{Q_{w_i}}{Q_e} \times 100 \text{ with } Q_e = Q_o + Q_w$$

The separator water draw-off (in vol %) is a volume concentration that can be represented as a volume fraction, as the volumes of the constituents are additive (as the total volume is constant flowing through the separator train 100).

Figure 2:
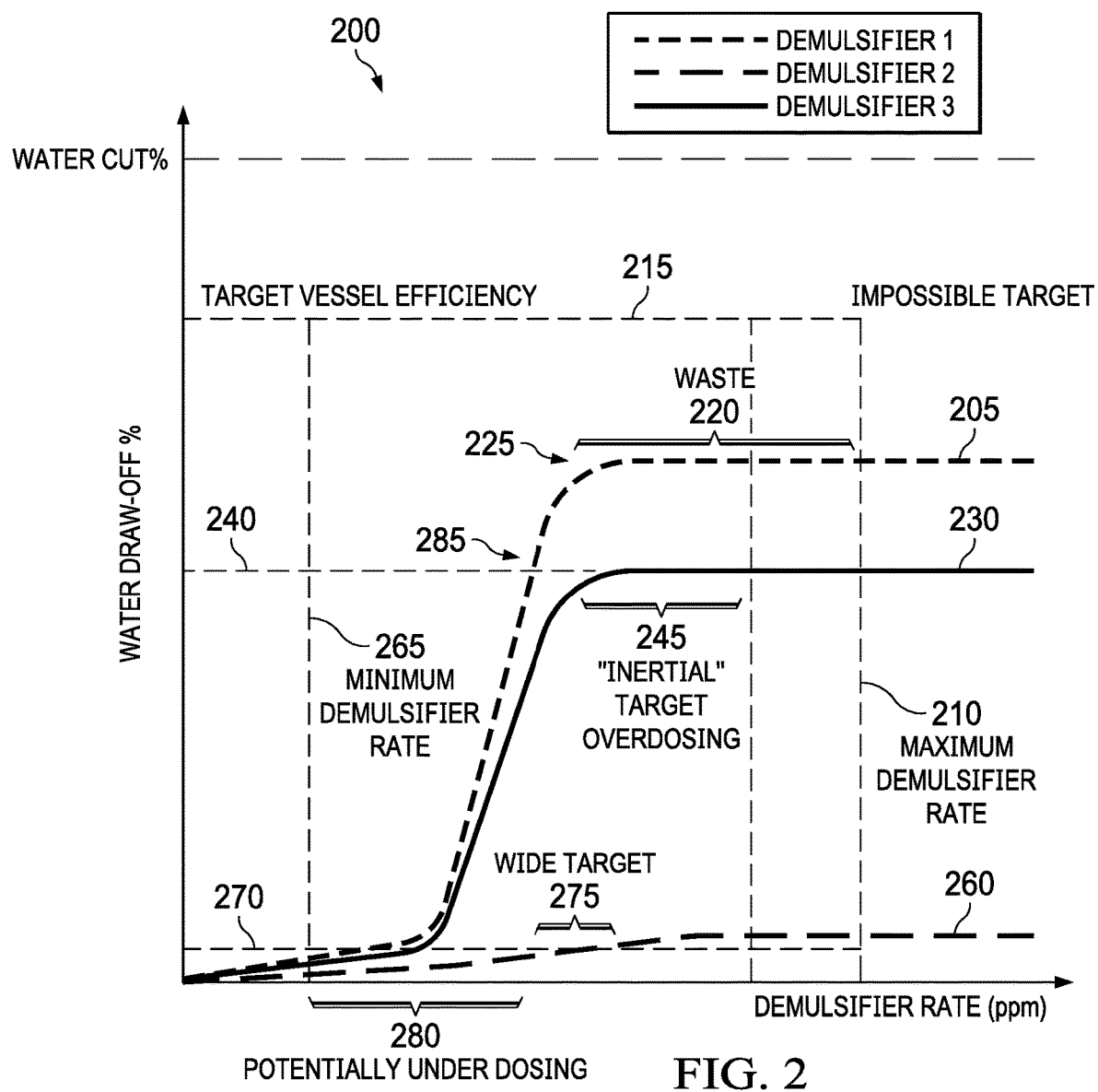
FIG. 2 shows WSP plots illustrating three effects of demulsifier dosage errors impacting water draw-off from a separator vessel for different demulsifiers as a function of the demulsifier dosage rate.

FIG. 2 is an explanatory plot 200 of a WSP, being the water draw-off % vs. demulsifier rate from one or more phase separator vessel(s), be the HPPT, LPPT, or LPDT. The average water draw-off is expressed as:

$$\text{Water Draw} - \text{Off, \%} = \frac{\text{Flowrate of water separated}}{\text{Flowrate of wet crude oil emulsion}} \times 100$$

where the wet crude oil emulsion flowrate is the sum of the total crude oil flow rate and the total water flowrates from the separation plant over a period of time, such as one day, two days, one week, etc.

FIG. 2 illustrates how three major demulsifier dosage errors impact water draw-off from a separator vessel and the failure of typical demulsifier injection process control strategies. These effects are impossible target separation, wide target separation, and "inertial" target separation.

Impossible target separation occurs when the target vessel separation efficiency (water draw-off/inlet emulsion) cannot be attained with the performance of the actual demulsifier, as shown by curve 205. The demulsifier injection control increases the demulsifier rate to attain the target vessel efficiency 215 set by the operator. However, the in-place demulsifier has a maximum demulsifier rate 210 lower than the rate needed to reach the target vessel efficiency 215. As a consequence, a quantity of waste demulsifier 220 is generated as the system reaches its maximum efficiency 225 but still injects demulsifier until it reaches the maximum demulsifier rate 210 in a futile attempt to reach to the set target 215.

Wide target separation is illustrated by curve 260, which shows a WSP for a demulsifier that is insensitive in its response to a wide range of demulsifier rates. The control will tend to decrease the demulsifier rate, but the incremental change will lead to a wide target 275 where there is little or no change in water separation even with a wide change in demulsifier rate. After a few decrements, the demulsifier rate will reach the minimum demulsifier rate 265 specified by the operator. Though the water separation target 270 will seem to be achieved, the effect will be an underdose 280 of the demulsifier. This upsets production with a heavier load on the dehydrator with the potential to trip the dehydrator grid, causing a production shutdown.

Inertial target separation occurs when the water separation does not change due to the accumulation of a significant amount of demulsifier in the process, illustrated by curve 230. This can lead to an underestimation of the demulsifier rate by the operator. Alternatively, the specified demulsifier rate by the operator can be on the plateau of saturation 285 (also see FIG. 13) and the controller will overdose the demulsifier by an overdose amount 245.

Figure 3:
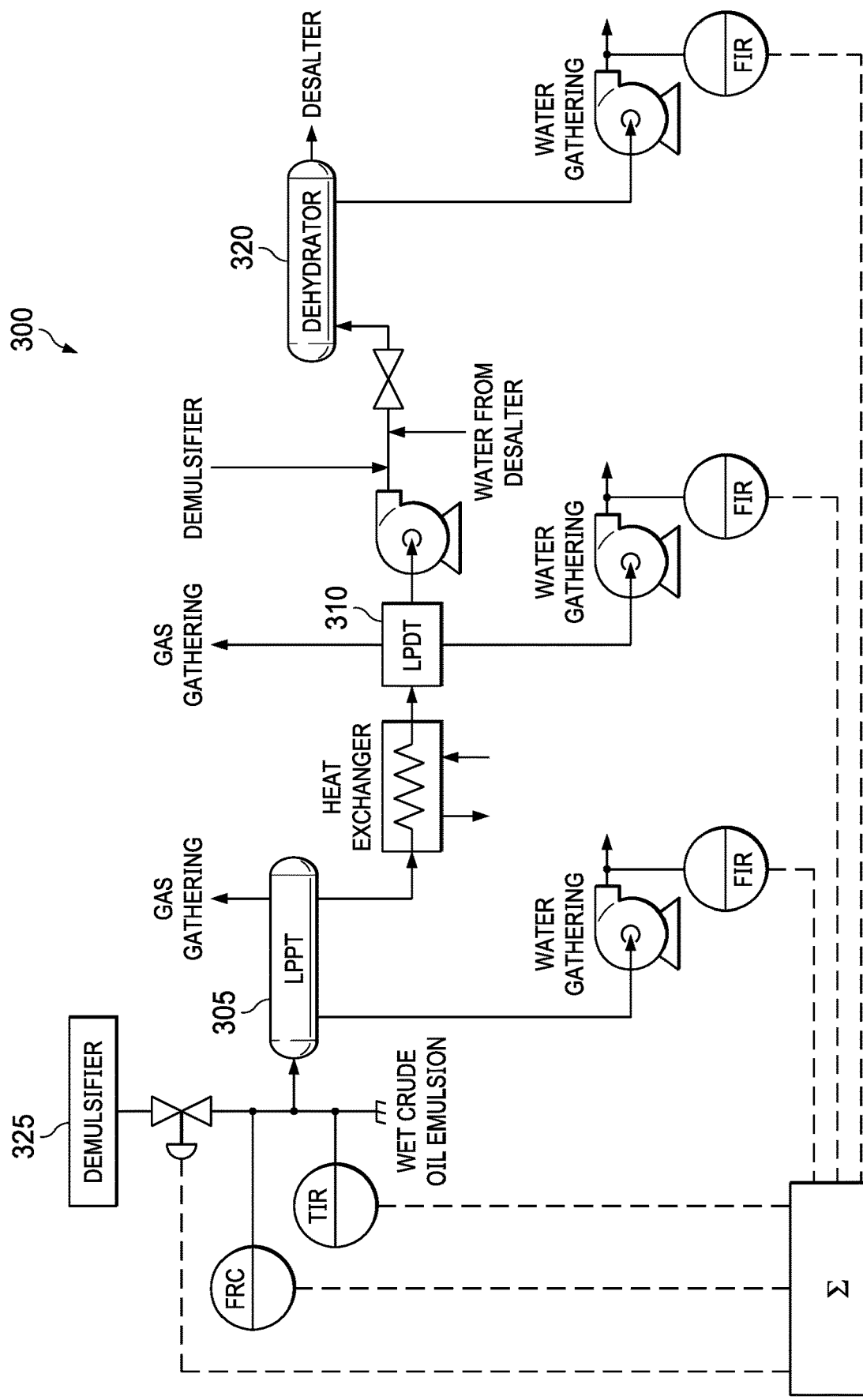
FIG. 3 is an example GOSP with a train of LPPT and LPDT vessels upstream of a dehydrator.

FIG. 3 shows a schematic of an example separation plant or GOSP 300 with separation vessels 102-1, 102-2, . . . 102-1 (of FIG. 1) forming a train of LPPT vessels 305 and LPDT vessels 310 upstream of a dehydrator 320 (or dehydration train if more than one dehydrator is present). The exiting flow rates from the vessels export crude stream, the produced water stream, and the produced water flow rates from each separator vessel 305, 310 and the dehydrator 320 are processed through the plant process automation system where the demulsifier dosage is computed and the demulsifier flow rate from a demulsifier reservoir 325 is controlled and adjusted to achieve the target demulsifier dosage.

Figure 4:
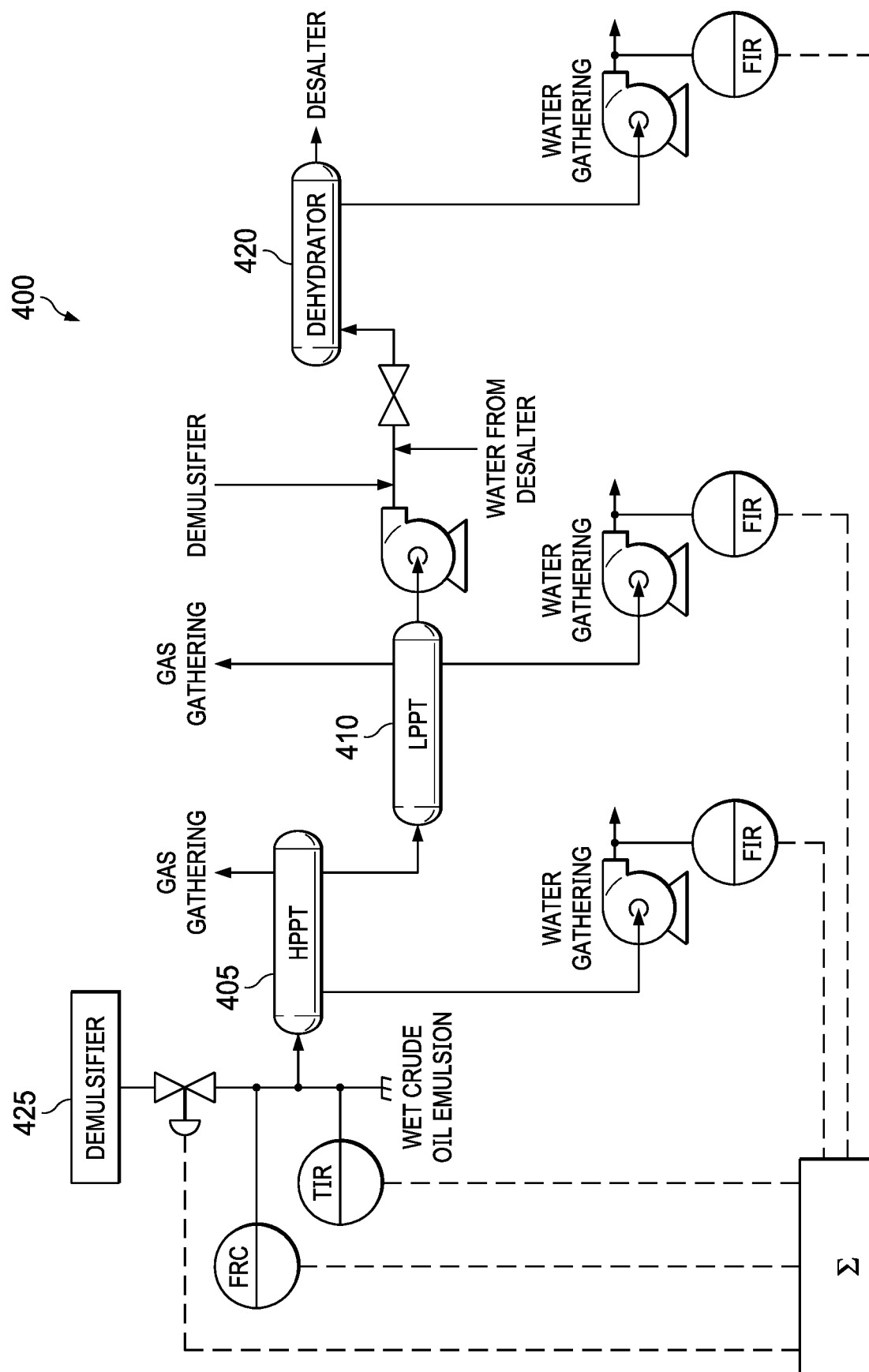
FIG. 4 is an example GOSP with a train of HPPT and LPPT vessels upstream of a dehydrator.

FIG. 4 shows a schematic of a separation plant or GOSP 400 with a train of HPPT vessels 405 and LPPT vessels 410 upstream of a dehydrator 420 (or dehydration train if more than one dehydrator is present). The flow rates from the vessels export crude stream, the produced water stream, and the produced water flow rates from each separator vessel 405, 410 and the dehydrator 420. The flows are processed through the plant process automation system where the demulsifier dosage is computed and the demulsifier flow rate from a demulsifier reservoir 425 is controlled and adjusted to achieve the target demulsifier dosage for a particular process.

Figure 5:
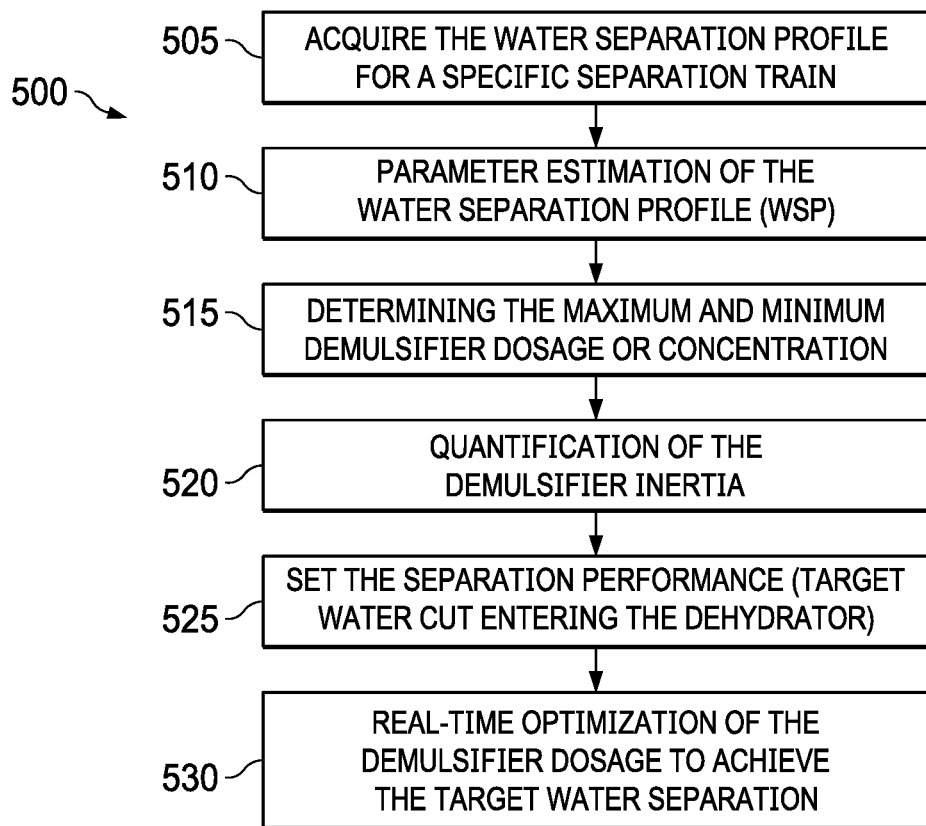
FIG. 5 is a flow chart illustrating the process for the real-time, automated demulsifier dosage tuning in a GOSP.

FIG. 5 describes the steps 500 for the real-time, efficient, and cost effective control of the water removal from a phase separator train of a GOSP such as GOSP 300 or 400 to achieve a target water concentration in oil entering the dehydrator vessel(s) (such as dehydrator 320, 420). The method includes the following steps: acquire the WSP for a specific separation train (step 505), estimate parameters of the WSP (step 510), determine the maximum and minimum demulsifier dosage or concentration (step 515), quantify the demulsifier inertia (step 520), set the separation performance for the target water cut entering the dehydrator 320, 420 (step 525), and adjust the demulsifier dosage to achieve the target water separation in real time (step 530).

For step 505, a real-time process test is performed to acquire data for the WSP for each vessel 102-1, 102-2, . . . 102-$i$ in a separation train 300, 400. The demulsifier flowrate is incremented by a set amount such as 10 ppm, in 24 hour intervals to achieve a step-wise increase in demulsifier dosage. The demulsifier injection flow rate is set to achieve a target dosage in parts-per-millions of demulsifier in the incoming wet crude. After holding at the peak demulsifier dosage, the demulsifier flow rate is decremented to quantify the inertia effect caused by the accumulation of demulsifier in the process.

The actual demulsifier flowrate and the water draw-off percentage are averaged over each time period for each separator vessel 102-1, 102-2, . . . 102-$i$ in the separation train 300, 400 and are used to construct the process-specific WSP of FIG. 5 for each vessel.

Figure 6:
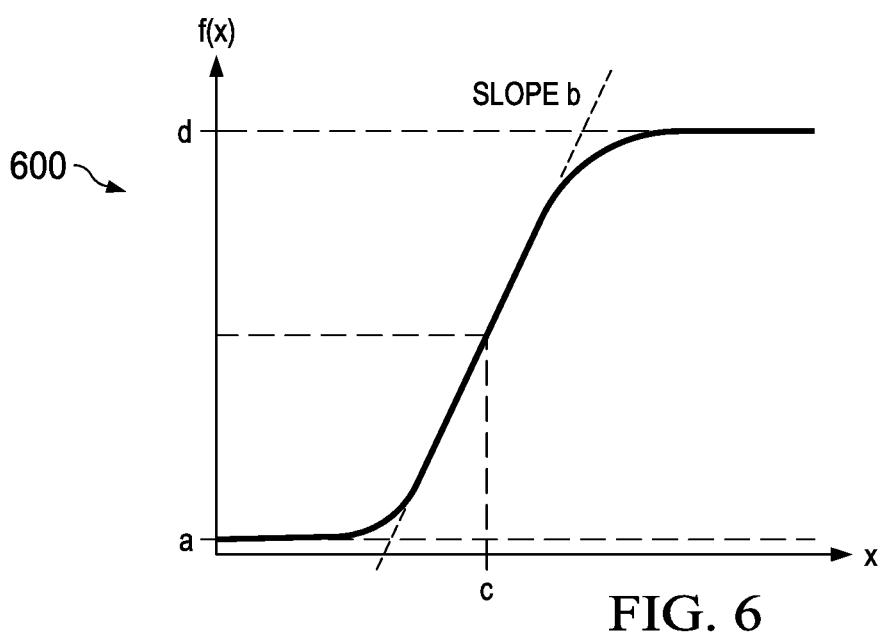
FIG. 6 is an example WSP modeled by a four-parameter logistic curve.

Step 510 involves parameter estimation of the experimentally generated WSP. Referring to FIG. 6, the example WSP 600 is fitted by a 4-parameter logistic (4PL) model:

$$f(x) = d + \frac{a-d}{1 + \left(\frac{x}{c}\right)^b}$$

where a is the minimum asymptote, d is the maximum asymptote, c is the inflection point, and b is the slope of the increasing section of the curve. In a WSP, the value of a corresponds to the minimum water draw-off with zero demulsifier. The value of a is often close or equal to 0. The value of c is the demulsifier dosage corresponding to 50% water separation, (calculated as (d-a)/2). The value of d corresponds to the maximum water separation for a specific demulsifier and process conditions (including temperature, pressure, flow rate, wet crude type and properties, inlet water cut, and upstream process equipment).

Figure 7:
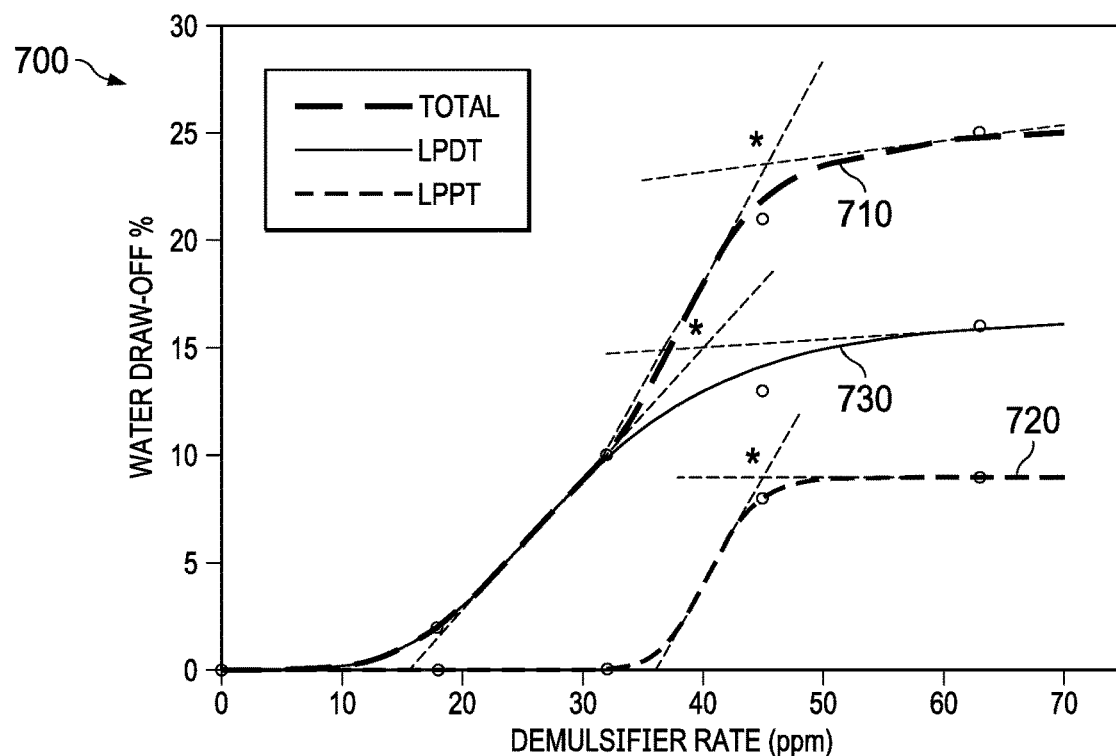
FIG. 7 is a WSP derived from field data for a specific demulsifier and process.

FIG. 7 shows values that were obtained by fitting such a 4PL curve to the field data for two separator vessels (an LPPT 305 and an LPDT 310) in a separator train (such as in FIG. 1 or FIG. 3). The total water draw-off curve 710 is the linear combination of the LPPT curve 720 and LPDT curve 730. The curve fit parameters a, b, c, and d of the 4PL models give the WSP for the example LPPT 305 and LPDT 310 vessels and are shown in Table 1.

TABLE 1

| Coefficient | LPPT | LPDT |
|---|---|---|
| a | −5.45 × 10⁻⁵ | −2.17 × 10⁻³ |
| b | 20.00 | 4.04 |
| c | 40.50 | 29.05 |
| d | 9.00 | 16.60 |

Step 515 involves determining the maximum and minimum demulsifier dosage, flowrate, or concentration for a given WSP such as curve 710. The demulsifier dosage is the concentration of demulsifier in the total inlet wet crude stream (the total oil and water produced from the process). The maximum and minimum demulsifier rates are found at the knee points of the 4PL curve. Knee points and inflection points of the function $f(x)$ are the solution of:

$$f''''(x) = 0$$

Where $f''''(x)$ is the fourth derivative of the 4PL equation $f(x)$. The solution of the 4PL function $f(x)$ can be found mathematically, for situations where a is set as zero or as non-zero (a>0).

For a boundary condition with no initial water separation (a=0), the 4PL function can be simplified. This condition correlates to no water separation if there is no demulsifier added to the process. Thus, the first derivative $f'(x)$ of the simplified 4PL function $f(x)$ as a function of b, c, and d is expressed as:

$$f(x) = d - \frac{d}{1 + \left(\frac{x}{c}\right)^b} \quad \& f'(x) = \frac{bd\left(\frac{x}{c}\right)^b}{x\left(1 + \left(\frac{x}{c}\right)^b\right)^2}$$

Figure 8:
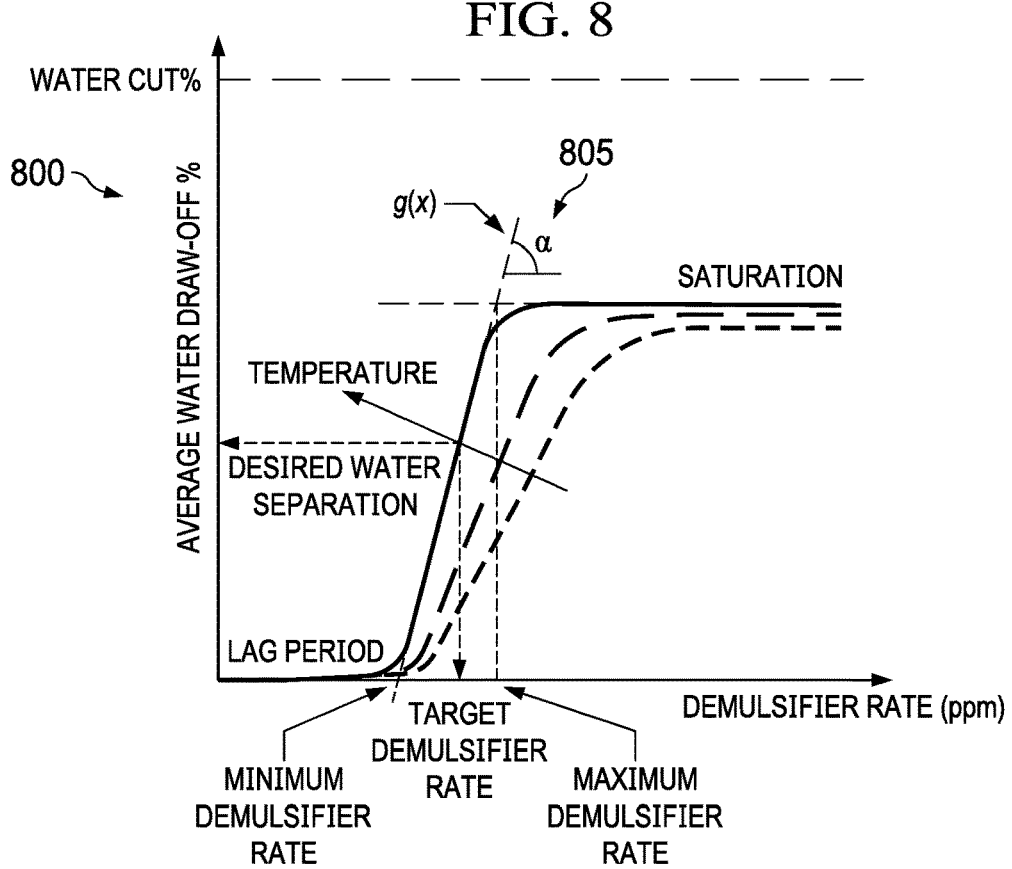
FIG. 8 is a WSP modeled by a four-parameter logistic curve.

In the WSP 800 of FIG. 8, the linear function g(x) passing tangentially through the point (c, $f$(c)) is determined from the solution for $f'$(c) and $f'$(c) expressed as a functions of b, c, and d:

$$f(c) = \frac{d}{2} \quad \& f'(c) = \frac{bd}{4c}$$

The value of the first derivative $f'$(c) is the slope α 805 of the linear curve (FIG. 8). The resolution of β is performed with the function g(x) at the point (c, g(c)). Therefore, the linear equation g(x) is expressed as follows:

$$g(x) = \alpha x + \beta \text{ with } \beta = d\left(\frac{1}{2} - \frac{b}{4}\right) \text{ and } \alpha = \frac{bd}{4c}$$

Finally, the minimum and maximum demulsifier rates ($r_{vessel}^{min}$ and $r_{vessel}^{MAX}$) are the solutions of the following equations:

$$f(r_{vessel}^{min}) = g(r_{vessel}^{min}) = 0$$

and $$f(r_{vessel}^{MAX}) = g(r_{vessel}^{MAX}) = d$$

Thus, $$r_{vessel}^{min} = c\left(1 - \frac{2}{b}\right) \text{ and } r_{vessel}^{MAX} = c\left(1 + \frac{2}{b}\right)$$

For the example in FIG. 7, the following values for the minimum and maximum demulsifier dosage were obtained:

| $r_{LPPT}^{min}$(ppm) | $r_{LPPT}^{MAX}$(ppm) |
|---|---|
| 36 | 45 |
| $r_{LPDT}^{min}$(ppm) | $r_{LPDT}^{MAX}$(ppm) |
| 15 | 43 |

For a boundary condition that allows initial water separation (a>0), the first derivative $f'(x)$ of the 4PL function $f(x)$ is expressed as a function of a, b, c and d as:

$$f(x) = d + \frac{a-d}{1+\left(\frac{x}{c}\right)^b} \& f'(x) = -\frac{b(a-d)\left(\frac{x}{c}\right)^b}{x\left(1+\left(\frac{x}{c}\right)^b\right)^2}$$

In the WSP 800 of FIG. 8, the linear function g(x) passing tangentially through the point (c, $f(c)$) is determined from the solution for $f(c)$ and $f'(c)$ expressed as a function of a, b, c, and d as $$f(c) = \frac{a+d}{2} \& f'(c) = \frac{b(d-a)}{4c}$$

The value of the first derivative $f'(c)$ is the slope of the linear curve α. The resolution of β is performed with the function g(x) at the point (c, g(c)). Therefore, the linear equation g(x) is expressed as $$g(x) = \alpha x + \beta \text{ with } \beta = d\left(\frac{1}{2} - \frac{b}{4}\right) + a\left(\frac{1}{2} + \frac{b}{4}\right) \text{ and } \alpha = \frac{b(d-a)}{4c}$$

Finally, the minimum and maximum demulsifier rates ($r_{vessel}^{min}$ and $r_{vessel}^{MAX}$) are the solution of the following equations:

$$f(r_{vessel}^{min}) = g(r_{vessel}^{min}) = a$$

and $$f(r_{vessel}^{MAX}) = g(r_{vessel}^{MAX}) = d$$

Thus, $$r_{vessel}^{min} = c\left(1 - \frac{2}{b}\right) \text{ and } r_{vessel}^{MAX} = c\left(1 + \frac{2}{b}\right)$$

As expected, the minimum and maximum demulsifier rates are the same solutions as if the system had no initial water separation.

Step 520 involves quantification of demulsifier inertia. The effect of inertia is due to the accumulation of demulsifier in the units of phase separation upstream of the dehydrator (such as dehydrator 320, 420). The demulsifier dosage (the amount of demulsifier chemical) is injected based in part on the inlet wet crude oil stream flow rate. The non-linear flow of liquids through the separator vessels 102-1, 102-2, ... 102-1 guarantees a non-uniform distribution of fluid parcel age through the vessels. There is typically a broad distribution in the residence time of the liquids through the separator train. A greater spread in the distribution reflects a greater range in the age of the fluid in the vessel, while a narrow spread in the distribution reflects a near plug flow and more uniform age of the fluid in the vessel. Some liquid appears at the outlet soon after entering the separator, while some liquid spends much longer in the vessel or vessels. As the concentration of demulsifier is in the parts-per-million range, when changing the demulsifier injection rate within a relatively short period of time, the effective dosage in the vessel is increased by the residual demulsifier still lagging in the separator. Accounting for this inertia effect is a factor in the determination of the correct dosage required to achieve a specific water draw-off. The inertia effect results in a time-delay in achieving the true water draw-off for a specific demulsifier dosage. The period of inertia is not included in the averaging of the process signals for the water flow rates from each separator vessel to determine the water draw-off for each separator vessel.

Figure 9:
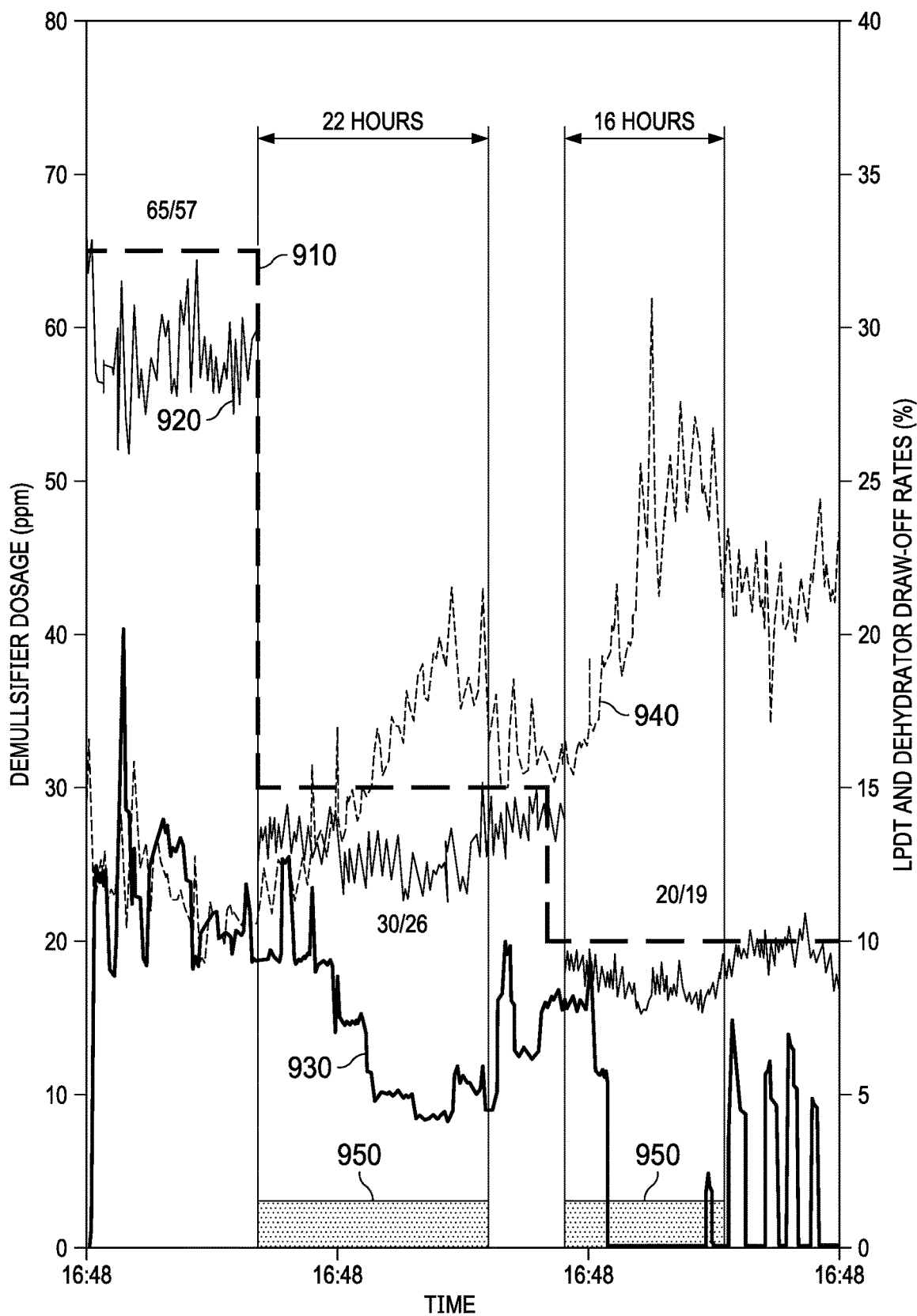
FIG. 9 illustrates the effect of inertia on a LPPT/LPDT process using field data.

FIG. 9 is a plot of an example actual field data that illustrates demulsifier inertia that can be present in GOSP 300 illustrated in FIG. 3. Here, the demulsifier dosage—set point and process values—are plotted with time along with the water separation from the LPDT 305 (or LPPT 310) and the dehydrator 320. The demulsifier rate target (curve 910), the demulsifier rate (920), the percent water separation in the LPDT 305 (curve 930), the percent water separation in the dehydrator 320 (curve 940), and the resulting inertia (areas 950) are illustrated.

As can be seen, as the demulsifier dosage is decremented in 24-hour intervals from 57 to 26 and then to 19 ppm, the corresponding separation performance in the LPDT 305 of curve 930 decreases gradually during each period. In FIG. 9, the process took 22 hours to stabilize when the demulsifier rate was decreased by 31 ppm (from 57 ppm to 26 ppm) and 16 hours when the demulsifier rate was decreased by 7 ppm (from 26 ppm to 19 ppm). The effect of the gradual water draw-off from the LPDT 305 is reflected in the gradual increase in the water separation in the dehydrator of curve 940.

Figure 10:
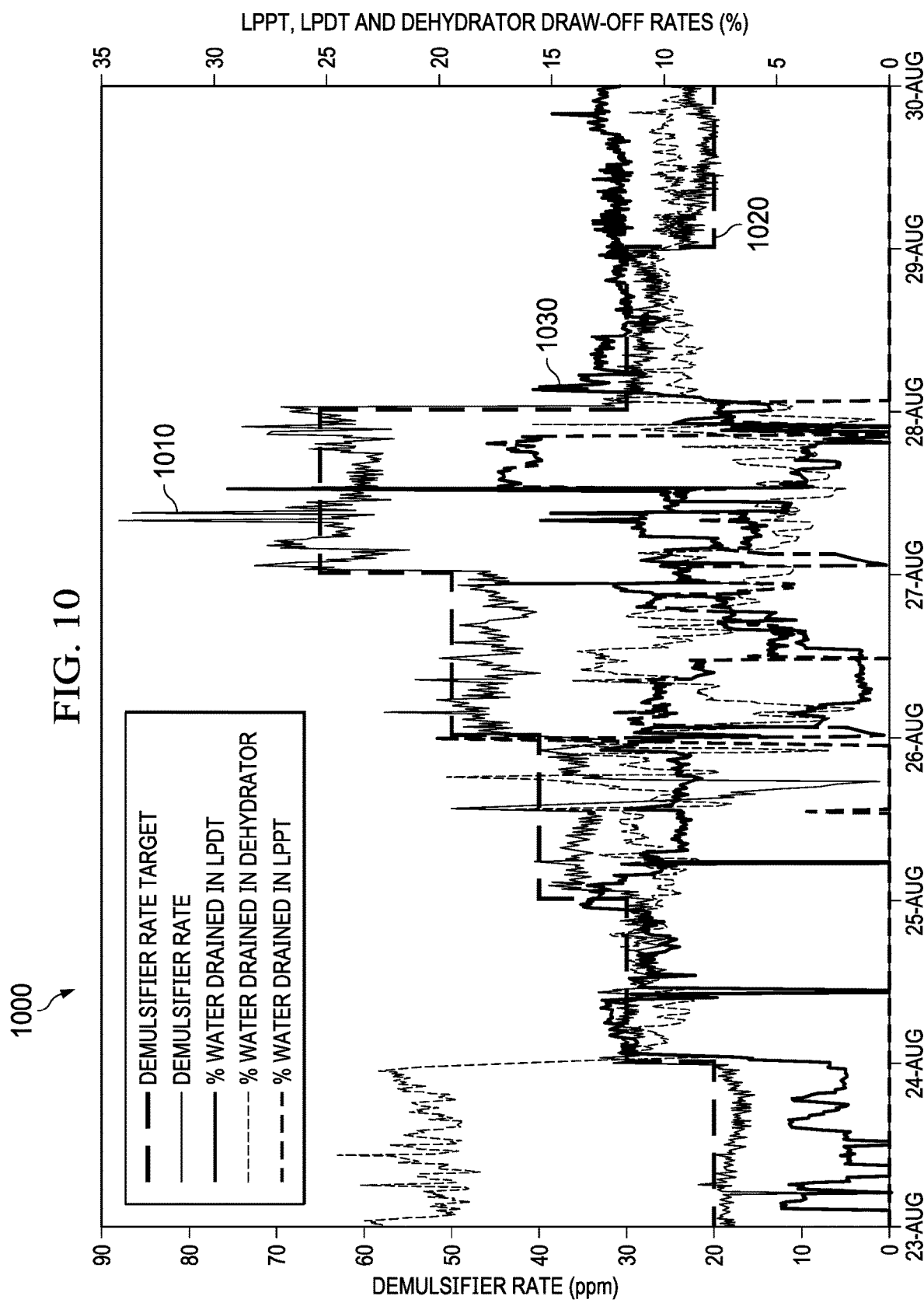
FIG. 10 is field data for the WSP using the same process but a different demulsifier than that used for FIG. 9.

FIG. 10 shows field data of a different demulsifier using the same process as shown in FIG. 9. In the example shown in FIG. 10, the demulsifier inertia is so predominant that the water draw-off did not level off after 24 hours. The effect of inertia is even more noticeable, if one compares the water draw-off of the LPDT 305 (curve 1030) at approximately 20 ppm at the beginning and at the end of the field test.

The effect of inertia in FIG. 9 is smaller than in the example in FIG. 10. Therefore, the phenomena can be determined by measuring the time needed for the system to stabilize. The stabilization is identified by the end of the increase of average water draw-off of the dehydrator as well as the decrease of the average water draw-off of the last vessel (the LPDT 305 in the examples shown in FIG. 9 and FIG. 10).

Step 525 involves setting the separation performance or the target water cut entering the dehydrator (such as dehydrator 320, 420). With the WSP for a given demulsifier implemented in the plant automation process control system, the operator sets the target water cut entering the dehydrator, thereby establishing the water separation performance for the LPPT or LPDT separator train according to Dehydrator Inlet Water Cut,%=Inlet Water Cut
%−Water draw-off %.

The separation performance is achieved automatically through the injection of the correct demulsifier dosage according to the WSP.

Figure 11:
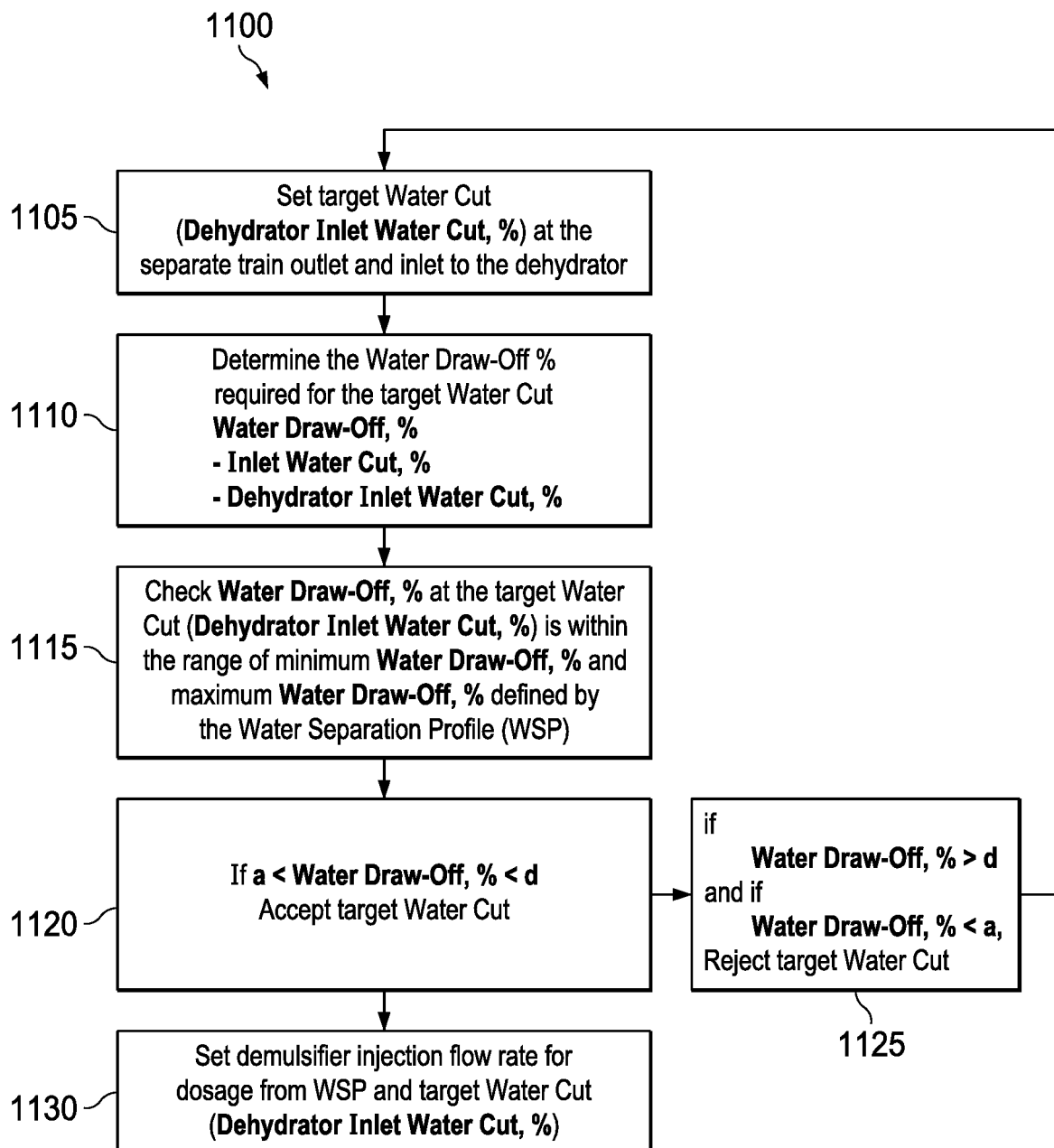
FIG. 11 is a flow chart illustrating a process for automatically determining the separation performance of a separator vessel through the injection of the correct demulsifier dosage according to the WSP.

FIG. 11 illustrates the process steps. First is to set target water cut (Dehydrator Inlet Water Cut, %) at the separator train outlet (the inlet to the dehydrator), step 1105. Then determine the water draw-off % required for the target water cut, step 1110, where Water Draw-Off, %=Inlet Water Cut, %−Dehydrator Inlet Water Cut, %. Next follows a check if the Water Draw-Off, % at the target Water Cut (Dehydrator Inlet Water Cut, %) is within the range of minimum Water Draw-Off, % and maximum Water Draw-Off, % defined by the WSP, step 1115. If a<Water Draw-Off, %<d (decision step 1120) the system accepts the target dehydrator inlet water cut and sets the demulsifier injection flow rate from the WSP and target water cut, step 1130.

If the target is below the minimum water draw-off from the WSP or exceeds the maximum water cut from the WSP (at step 1125), a warning is shown to the operator. If the operator validates the warning window, the target dehydrator inlet water cut is set to give the minimum water draw-off, or the target dehydrator inlet water cut is set to give the maximum water draw-off, respectively. If not, the system requests a revised target water cut from the operator.

Following the acceptance of the target dehydrator inlet water cut, the demulsifier flow rate is controlled to achieve the required dosage and target separation performance. The demulsifier injection rate is a function of the required dosage (the produced oil and water flow rates) and the stream temperature and the retention time in each separator vessel (as determined from the separator level set points). Increasing the dosage increases the water draw-off and lowers the inlet water cut (the target water cut at the separator train outlet and inlet to the dehydrator). Decreasing the dosage decreases water draw-off and increases the inlet water cut.

The demulsifier dosage or concentration in the inlet wet crude stream is calculated from the ratio of the demulsifier injection rate and the inlet wet crude stream flowrate. The inlet wet crude stream flow rate is calculated from the oil and water flow rates produced by the separation plant, or may be measured upstream of the separation plant by multi-phase flowmeter. The demulsifier injection rate adjusts with the inlet wet crude flow rate to achieve a target demulsifier concentration.

The demulsifier dosage is additionally dependent on the stream temperature, as determined from the temperature of the gas exiting each separator vessel 102-1, 102-2, ... 102-$i$ (HPPT 405, LPPT 305 or 410, LPDT 310). Greater temperatures require less dosage while lower temperatures require greater dosages. The control system continuously controls the demulsifier injection flow rate to achieve the set point water cut at the inlet to the dehydrator.

Figure 12:
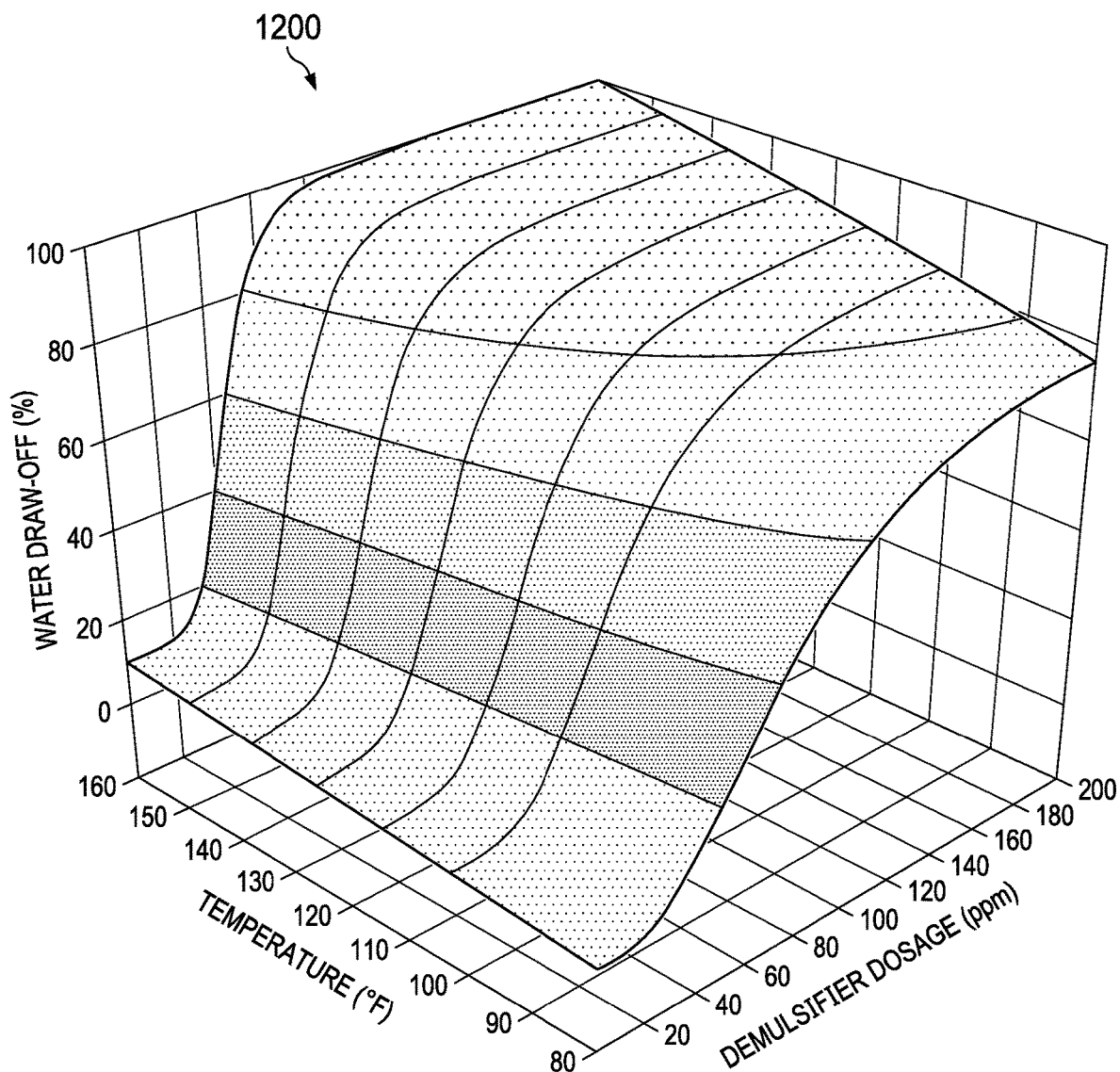
FIG. 12 is a water separation surface profile illustrating the influence of temperature on water draw-off.

Step 530 involves real-time calculation and adjustment of the demulsifier dosage to achieve the target water separation as affected by operating variables. FIG. 12 shows the three-dimensional WSP surface 1200 used to control demulsifier dosage for a given water separation performance or percentage water draw-off over a range of operating temperatures. The separator water flow rates, temperatures, produced oil and water flow rates and demulsifier injection flow rates recorded during operation are used to tune the 4-parameter logistic curve over a range of operating temperatures in the separator vessels 102-1, 102-2, ... 102-1. A WSP thus can be constructed in three dimensions as shown in FIG. 12 since the WSP gives the relationship between the three variables of separator water draw-off, demulsifier dosage, and operating temperature of the incumbent crude oil, produced water, and demulsifier chemical. As can be seen, the parameters of the fit for each two-dimensional WSP changes with temperature. The maximum and minimum values (a and d in FIG. 6.) is lower at lower temperature when compared to higher temperatures, while the slope b increases and the inflection point c decreases. Thus, each operating temperature has a corresponding temperature-specific WSP with differing parameters.

Figure 13:
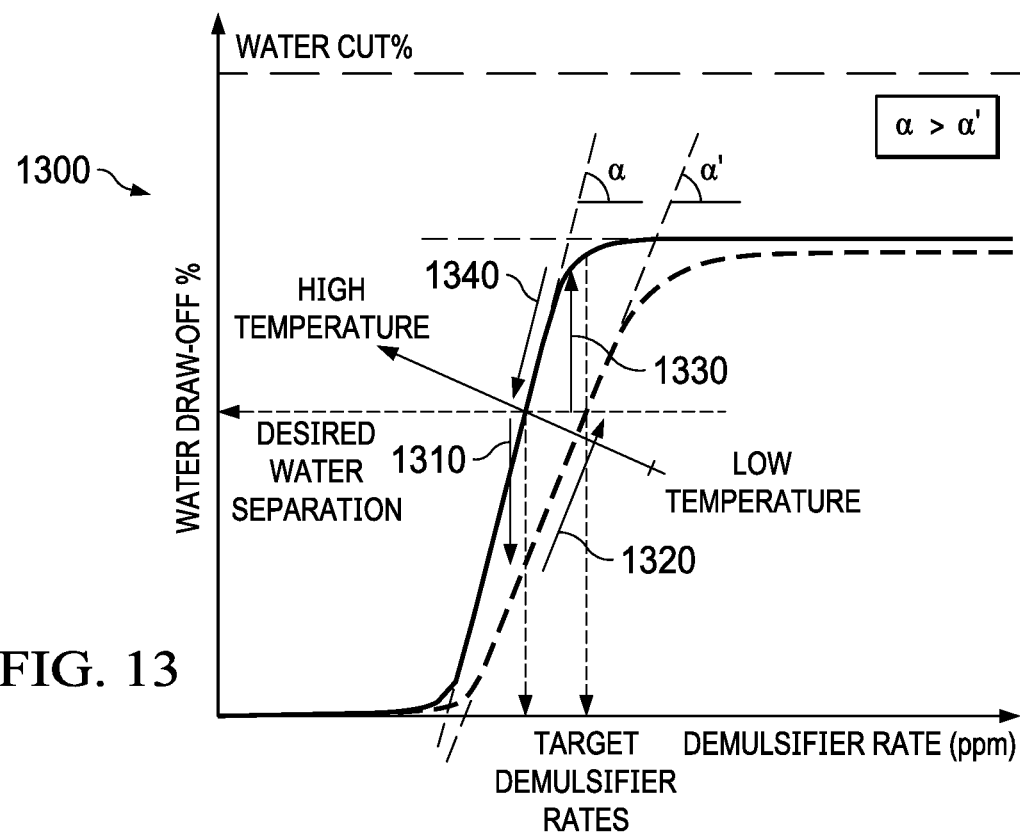
FIG. 13 explains the effect of temperature on the control strategy.

To illustrate these effects, FIG. 13 shows two WSP curves from the WSP surface of FIG. 12 at two different temperatures. As the temperature decreases (direction 1310), the system will slide up on the WSP (increasing the demulsifier rate) to match the desired water separation (direction 1320). On the other hand, when the temperature increases (direction 1330), the system will slide down on the WSP (decreasing the demulsifier rate) to match the desired water separation (direction 1340). As the system logs the water draw-off as function of increasing or decreasing demulsifier rate (and taking in consideration the inertia of the demulsifier) for a given temperature, the system is able to build linear curves of slope $\alpha'$ for a cool temperature and a for a warm temperature. The system is then able to anticipate the changes due to temperature that happen during daytime and night cycles.

Figure 14:
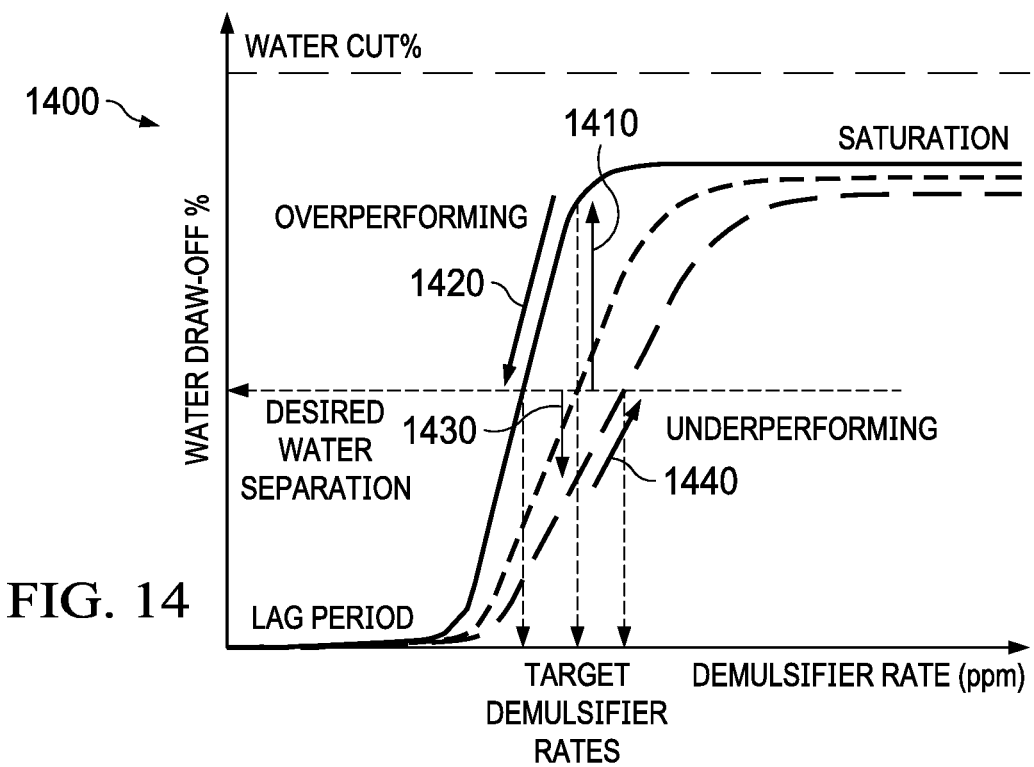
FIG. 14 explains over-performing or under-performing water separation for demulsifier dosage.

Referring to FIG. 14, the demulsifier injection rate control system processes the target set point water separation (dehydrator inlet water cut %) to control the demulsifier dosage based on the determined WSP. The water separation can be greater or lesser than the WSP model for the control demulsifier dosage for the operating conditions (beyond an acceptable range), temperature and produced crude oil and water flow rates. This can be an indication of underlying variations in the demulsifier response behavior due to changes in the operating conditions, temperature, and produced crude oil and water flow rates and shift the WSP.

If the demulsifier is overperforming (1410) at normal operating conditions (same temperature, produced crude oil and water flow rates), a warning of "overperforming demulsifier" is posted to the operator. If the operator agrees to proceed with this overperforming batch of demulsifier, the system will build the section of linear curve while coming back to the desired water separation (1420).

If the demulsifier is underperforming (1430) at normal operating conditions (same temperature, produced crude oil and water flow rates), a warning of "underperforming demulsifier" is posted to the operator. If the operator agrees to proceed with this underperforming batch of demulsifier, the system will build the section of linear curve while coming back to the desired water separation (1440).

Figure 15:
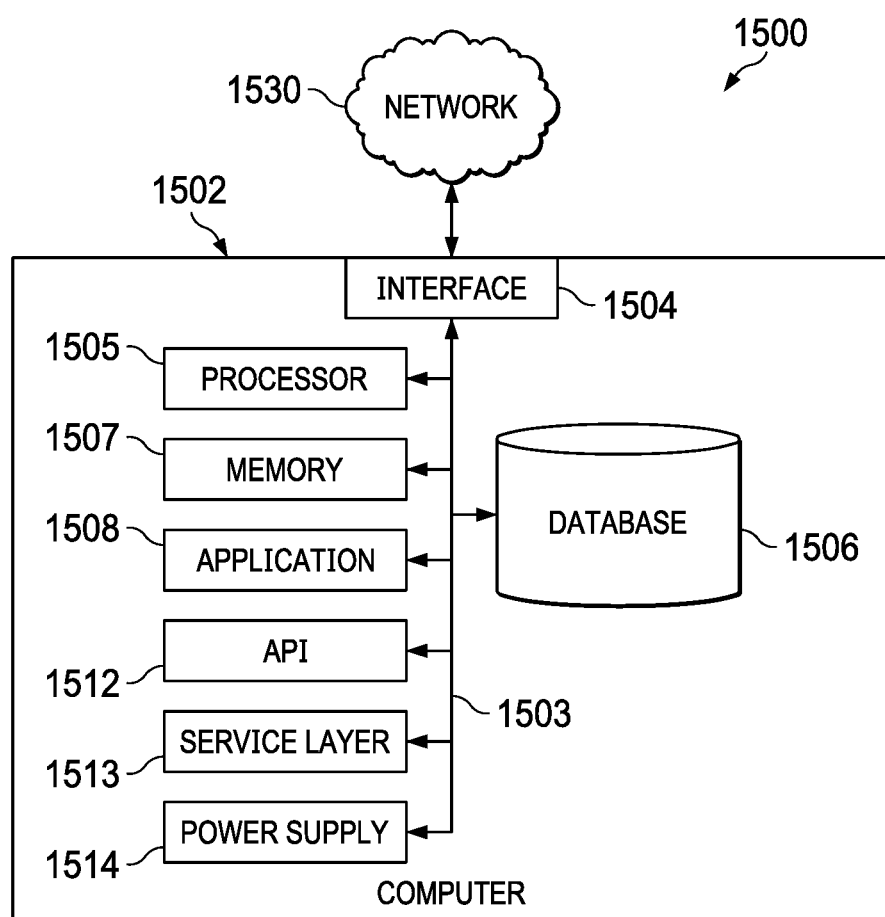
FIG. 15 is a block diagram illustrating an example computer system used to provide computational functionalities associated with described algorithms, methods, functions, processes, flows, and procedures as described in the present disclosure, according to some implementations of the present disclosure.

FIG. 15 is a block diagram of an example computer system 1500 used to provide computational functionalities associated with described algorithms, methods, functions, processes, flows, and procedures described in the present disclosure, according to some implementations of the present disclosure. The illustrated computer 1502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1502 can include input devices such as keypads, keyboards, and touch screens that can accept user information. Also, the computer 1502 can include output devices that can convey information associated with the operation of the computer 1502. The information can include digital data, visual data, audio information, or a combination of information. The information can be presented in a graphical user interface (UI) (or GUI).

The computer 1502 can serve in a role as a client, a network component, a server, a database, a persistency, or components of a computer system for performing the subject matter described in the present disclosure. The illustrated computer 1502 is communicably coupled with a network 1530. In some implementations, one or more components of the computer 1502 can be configured to operate within different environments, including cloud-computing-based environments, local environments, global environments, and combinations of environments.

At a high level, the computer 1502 is an electronic computing device operable to receive, transmit, process, store, and manage data and information associated with the described subject matter. According to some implementations, the computer 1502 can also include, or be communicably coupled with, an application server, an email server, a web server, a caching server, a streaming data server, or a combination of servers.

The computer 1502 can receive requests over network 1530 from a client application (for example, executing on another computer 1502). The computer 1502 can respond to the received requests by processing the received requests using software applications. Requests can also be sent to the computer 1502 from internal users (for example, from a command console), external (or third) parties, automated applications, entities, individuals, systems, and computers.

Each of the components of the computer 1502 can communicate using a system bus 1503. In some implementations, any or all of the components of the computer 1502, including hardware or software components, can interface with each other or the interface 1504 (or a combination of both), over the system bus 1503. Interfaces can use an application programming interface (API) 1512, a service layer 1513, or a combination of the API 1512 and service layer 1513. The API 1512 can include specifications for routines, data structures, and object classes. The API 1512 can be either computer-language independent or dependent. The API 1512 can refer to a complete interface, a single function, or a set of APIs.

The service layer 1513 can provide software services to the computer 1502 and other components (whether illustrated or not) that are communicably coupled to the computer 1502. The functionality of the computer 1502 can be accessible for all service consumers using this service layer. Software services, such as those provided by the service layer 1513, can provide reusable, defined functionalities through a defined interface. For example, the interface can be software written in JAVA, C++, or a language providing data in extensible markup language (XML) format. While illustrated as an integrated component of the computer 1502, in alternative implementations, the API 1512 or the service layer 1513 can be stand-alone components in relation to other components of the computer 1502 and other components communicably coupled to the computer 1502. Moreover, any or all parts of the API 1512 or the service layer 1513 can be implemented as child or sub-modules of another software module, enterprise application, or hardware module without departing from the scope of the present disclosure.

The computer 1502 includes an interface 1504. Although illustrated as a single interface 1504 in FIG. 15, two or more interfaces 1504 can be used according to particular needs, desires, or particular implementations of the computer 1502 and the described functionality. The interface 1504 can be used by the computer 1502 for communicating with other systems that are connected to the network 1530 (whether illustrated or not) in a distributed environment. Generally, the interface 1504 can include, or be implemented using, logic encoded in software or hardware (or a combination of software and hardware) operable to communicate with the network 1530. More specifically, the interface 1504 can include software supporting one or more communication protocols associated with communications. As such, the network 1530 or the interface's hardware can be operable to communicate physical signals within and outside of the illustrated computer 1502.

The computer 1502 includes a processor 1505. Although illustrated as a single processor 1505 in FIG. 15, two or more processors 1505 can be used according to particular needs, desires, or particular implementations of the computer 1502 and the described functionality. Generally, the processor 1505 can execute instructions and can manipulate data to perform the operations of the computer 1502, including operations using algorithms, methods, functions, processes, flows, and procedures as described in the present disclosure.

The computer 1502 also includes a database 1506 that can hold data for the computer 1502 and other components connected to the network 1530 (whether illustrated or not). For example, database 1506 can be an in-memory, conventional, or a database storing data consistent with the present disclosure. In some implementations, database 1506 can be a combination of two or more different database types (for example, hybrid in-memory and conventional databases) according to particular needs, desires, or particular implementations of the computer 1502 and the described functionality. Although illustrated as a single database 1506 in FIG. 15, two or more databases (of the same, different, or combination of types) can be used according to particular needs, desires, or particular implementations of the computer 1502 and the described functionality. While database 1506 is illustrated as an internal component of the computer 1502, in alternative implementations, database 1506 can be external to the computer 1502.

The computer 1502 also includes a memory 1507 that can hold data for the computer 1502 or a combination of components connected to the network 1530 (whether illustrated or not). Memory 1507 can store any data consistent with the present disclosure. In some implementations, memory 1507 can be a combination of two or more different types of memory (for example, a combination of semiconductor and magnetic storage) according to particular needs, desires, or particular implementations of the computer 1502 and the described functionality. Although illustrated as a single memory 1507 in FIG. 15, two or more memories 1507 (of the same, different, or combination of types) can be used according to particular needs, desires, or particular implementations of the computer 1502 and the described functionality. While memory 1507 is illustrated as an internal component of the computer 1502, in alternative implementations, memory 1507 can be external to the computer 1502.

The application 1508 can be an algorithmic software engine providing functionality according to particular needs, desires, or particular implementations of the computer 1502 and the described functionality. For example, application 1508 can serve as one or more components, modules, or applications. Further, although illustrated as a single application 1508, the application 1508 can be implemented as multiple applications 1508 on the computer 1502. In addition, although illustrated as internal to the computer 1502, in alternative implementations, the application 1508 can be external to the computer 1502.

The computer 1502 can also include a power supply 1514. The power supply 1514 can include a rechargeable or non-rechargeable battery that can be configured to be either user- or non-user-replaceable. In some implementations, the power supply 1514 can include power-conversion and management circuits, including recharging, standby, and power management functionalities. In some implementations, the power-supply 1514 can include a power plug to allow the computer 1502 to be plugged into a wall socket or a power source to, for example, power the computer 1502 or recharge a rechargeable battery.

There can be any number of computers 1502 associated with, or external to, a computer system containing computer 1502, with each computer 1502 communicating over network 1530. Further, the terms "client," "user," and other appropriate terminology can be used interchangeably, as appropriate, without departing from the scope of the present disclosure. Moreover, the present disclosure contemplates that many users can use one computer 1502 and one user can use multiple computers 1502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures can be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking cannot be necessary since the locking of exchange file system can be done at application layer. Furthermore, Unicode data files can be different from non-Unicode data files.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
controlling water separation in a hydrocarbon stream flowing through a separator train comprising one or more separator vessels located upstream of a dehydrator by adjusting a flowrate of demulsifier added to the separator train by:
receiving data from a real-time process test of the separation train;
quantifying a demulsifier inertia value from the process data;
estimating model fit parameters to the process data to generate a water separation profile (WSP) correlating water draw-off and demulsifier flowrate for the separation train; and
during operations, modifying the demulsifier flowrate according to the WSP and according to the inertia value to achieve a received target water separation value for the stream entering the dehydrator.

2. The computer-implemented method of claim 1, wherein the real-time process test data are acquired by:
performing a series of step-wise increases up to a peak value in incoming demulsifier flowrate during a series of time periods to achieve a target flowrate of demulsifier for each time period;
recording an actual demulsifier flowrate and a water draw-off rate during each time period;
performing a series of step-wise decreases of the incoming demulsifier flowrate entering the separator train during a time period to achieve a target flowrate of demulsifier for each time period; and
recording the actual demulsifier flowrate and a water draw-off rate during each time period.

3. The computer-implemented method of claim 2, comprising determining a stabilization time during each time period for the recorded water draw-off rate to stabilize.

4. The computer-implemented method of claim 3, wherein determining the stabilization time comprises identifying an end of an increase of average water draw-off of the dehydrator as well as the decrease of the average water draw-off of the last vessel.

5. The computer-implemented method of claim 3, wherein determining the stabilization time comprises identifying an end of the decrease of the average water draw-off of the separation train.

6. The computer-implemented method of claim 2, wherein adjusting the demulsifier flowrate comprises adjusting the demulsifier flowrate according to a temperature-specific WSP.

7. The computer-implemented method of claim 2, wherein each time period is 24 hours.

8. A system, comprising:
a separator train comprising one or more separator vessels;
a dehydrator located downstream of the separator train;
a demulsifier reservoir connected to the separator train; and
one or more processors with a non-transitory computer-readable storage medium coupled to the one or more processors and storing programming instructions for execution by the one or more processors, the programming instructions instructing the one or more processors to perform operations comprising:
controlling water separation in a hydrocarbon stream flowing through a separator train comprising one or more separator vessels located upstream of a dehydrator by adjusting a flowrate of demulsifier added to the separator train from the demulsifier reservoir by:
receiving data from a real-time process test of the separation train;
quantifying a demulsifier inertia value from the process data;
estimating model fit parameters to the process data to generate a water separation profile (WSP) correlating water draw-off and demulsifier flowrate for the separation train; and
during operations, modifying the demulsifier flowrate according to the WSP and according to the inertia value to achieve a received target water separation value for the stream entering the dehydrator.

9. The system of claim 8, wherein the real-time process test data are acquired by:
performing a series of step-wise increases up to a peak value in incoming demulsifier flowrate during a series of time periods to achieve a target flowrate of demulsifier for each time period;
recording an actual demulsifier flowrate and a water draw-off rate during each time period;
performing a series of step-wise decreases of the incoming demulsifier flowrate entering the separator train during a time period to achieve a target flowrate of demulsifier for each time period; and
recording the actual demulsifier flowrate and a water draw-off rate during each time period.

10. The system of claim 9, comprising determining a stabilization time during each time period for the recorded water draw-off rate to stabilize.

11. The system of claim 10, wherein determining the stabilization time comprises identifying an end of an increase of average water draw-off of the dehydrator as well as the decrease of the average water draw-off of the last vessel.

12. The system of claim 10, wherein determining the stabilization time comprises identifying an end of the decrease of the average water draw-off of the separation train.

13. The system of claim 9, wherein adjusting the demulsifier flowrate comprises adjusting the demulsifier flowrate according to a temperature-specific WSP.

14. The system of claim 9, wherein each time period is 24 hours.

15. A non-transitory, computer-readable medium storing one or more instructions executable by a computer system to perform operations comprising:
controlling water separation in a hydrocarbon stream flowing through a separator train comprising one or more separator vessels located upstream of a dehydrator by adjusting a flowrate of demulsifier added to the separator train by:
receiving data from a real-time process test of the separation train;
quantifying a demulsifier inertia value from the process data;

estimating model fit parameters to the process data to generate a water separation profile (WSP) correlating water draw-off and demulsifier flowrate for the separation train; and during operations, modifying the demulsifier flowrate according to the WSP and according to the inertia value to achieve a received target water separation value for the stream entering the dehydrator.

* * * * *